(12) United States Patent
Goerl et al.

(10) Patent No.: US 6,713,534 B2
(45) Date of Patent: Mar. 30, 2004

(54) RUBBER POWDERS HAVING PULVERULENT SILICATIC FILLERS AND PREPARED FROM RUBBERS PRESENT IN ORGANIC SOLVENTS, A PROCESS FOR THEIR PREPARATION, AND THEIR USE

(75) Inventors: Udo Goerl, Recklinghausen (DE); Matthias Schmitt, Neckargemuend (DE); Reinhard Stober, Hasselroth (DE); Andreas Gouw, Haltern (DE)

(73) Assignee: PKU Pulverkautschuk Union GmbH, Marl (DE)

( * ) Notice: Subject to any disclaimer, the term of this patent is extended or adjusted under 35 U.S.C. 154(b) by 0 days.

(21) Appl. No.: 10/118,963

(22) Filed: Apr. 10, 2002

(65) Prior Publication Data

US 2003/0036593 A1 Feb. 20, 2003

(30) Foreign Application Priority Data

Apr. 10, 2001 (DE) .......................... 101 17 804

(51) Int. Cl.⁷ ............................... C08J 3/215
(52) U.S. Cl. ..................... 523/333; 523/342; 524/439; 524/571; 524/575.5; 524/527; 525/342
(58) Field of Search ................ 523/333, 334, 523/342, 351; 524/543, 571, 574, 261, 439, 575.5, 577; 525/342

(56) References Cited

U.S. PATENT DOCUMENTS 5,166,227 A * 11/1992 Raines et al. .............. 523/342
5,859,117 A * 1/1999 Goerl et al. ............... 524/493
6,147,147 A * 11/2000 Hoover et al. ............. 524/175

FOREIGN PATENT DOCUMENTS

DE        198 43 301        3/2000

OTHER PUBLICATIONS

Stochem–Specialty Chemical Distribution, 'Online!' XP–002235957, <URL:http://www.stochem.com/searchd-b.asp?searchStr2=Ultrasil>, pp. 1–2, Mar. 24, 2003.

* cited by examiner

*Primary Examiner*—David W. Wu
*Assistant Examiner*—Satyā Sastri
(74) *Attorney, Agent, or Firm*—Oblon, Spivak, McClelland, Maier & Neustadt, P.C.

(57) ABSTRACT

A fine-particle, free-flowing rubber powder containing silicatic fillers, one or more organosilanes having trialkoxysilyl groups, and a rubber prepared by solution polymerization is prepared by a process that starts from a two-phase system: 1) filler in water, and 2) rubber in organic solvent. A rubber/silicatic filler/silane composite is formed during transfer, under gentle conditions, of the various reactants into a single phase. The process features a high degree of freedom in selecting forms of filler and in selecting the organosilane and gives a finished rubber powder in which a silicatic filler and an organosilane have undergone complete chemical reaction.

17 Claims, No Drawings

RUBBER POWDERS HAVING PULVERULENT SILICATIC FILLERS AND PREPARED FROM RUBBERS PRESENT IN ORGANIC SOLVENTS, A PROCESS FOR THEIR PREPARATION, AND THEIR USE

BACKGROUND OF THE INVENTION

1. Field of the Invention

The invention relates to a process for preparing a rubber powder comprising a filler which has a silanol group and which has been modified using an organosilicon compound.

2. Discussion of the Background

A wide variety of publications has appeared concerning the purpose and benefits of using rubber powders, and also concerning possible processes for their preparation (U. Görl, K. H. Nordsiek, Kautsch. Gummi Kunstst. 51 (1998) 250; U. Görl, H. Lauer, Gummi, Fasern Kunstst. 53 (2000) 261; and R. Uphus, 0. Skibba, R. H. Schuster, U. Görl, Kautsch. Gummi Kunstst. 53 (2000) 276).

The interest in pulverulent rubbers probably stems from the processing technology used in the rubber industry, where rubber mixtures are prepared at high cost in terms of time, energy, and personnel. The main reason for this is that the raw rubber material is in the form of bales, and that the other constituents of the vulcanizable mixture have to be incorporated into the rubber phase.

Comminution of the bale and intimate mixing with fillers, mineral oil plasticizers, and vulcanization auxiliaries takes place on rolls or internal mixers in a number of process stages. Between the stages, the mixture is generally cooled on a batch-off system, laid out in milled sheet form on pallets, and put into intermediate storage. Downstream of the internal mixers or rolls there are appropriate extrusion or calendering processes.

Completely new processing technology is needed in order to avoid this very complicated method of rubber processing.

For some time there have been discussions on the use of free-flowing rubber powders which allow rubber mixtures to be processed as simply and rapidly as thermoplastic powders or pellets.

The preparation of the rubbers usually used in the rubber industry, via polymerization of various monomers, is generally divided into two fundamentally different processes: a) polymerization in water and b) polymerization in organic solvents.

a) Polymerization in Water (Emulsion Polymerization)

This process polymerizes the starting monomers (e.g. styrene, butadiene, or acrylonitrile) by a free-radical route in water to give high-molecular-weight units, with the aid of suitable initiator molecules. The factors determining the properties of the polymer, and also its molecular structure, and thus also the subsequent performance profile of the finished rubber mixture, include: the monomer units used, their respective percentage proportions, and also the reaction conditions selected (e.g. temperature, pressure). When emulsifiers are present, the rubber molecules are present as finely divided droplets in water after the polymerization. The terms latex or rubber emulsion are used in this context. This forms the raw rubber material for preparing rubber powder from the aqueous phase. This powder generally is produced by addition of fillers (e.g. industrial carbon blacks or precipitated silicatic fillers) followed by acid-catalyzed coprecipitation of rubber emulsion and filler.

Known rubbers present in or prepared in water are natural rubber (NR), emulsion styrene-butadiene rubber (ESBR), nitrite-butadiene rubber (NBR) and chloroprene rubber (CR). DE-C 28 22 148 describes a process for preparing a rubber powder from coprecipitation of rubber emulsion and a filler carried out in the aqueous phase.

Other versions of this process have been published in DE-C 37 23 213 and DE-C 37 23 214. They are aimed at eliminating the grain-size-dependent filler contents which result in the process.

More recent publications concerning the preparation of rubber powders by coprecipitation of filler and rubber emulsion in water have increasingly dealt separately with 1) the nature of each of the fillers used in the rubber industry, and 2) with the way in which each filler is used. The background to this is recognition that various classes of fillers also require a variety of processes for complying with specifications for the preparation of a rubber powder.

DE 198 16 972.8 describes for the first time the use of organosilanes and the way these compounds are used in the preparation of rubber powders.

The patent specification starts from what are known as presilanized fillers, the preparation of which is described in EP 0 442 143 131 and EPA 0 126 871, for example. This process begins with a mixing procedure which homogenizes the filler, e.g. a silica, with the organosilane, and this is followed by reaction of the filler at an elevated temperature. This homogenization process may take place using dried filler (dry process) or else in aqueous suspension (wet process). To prepare the rubber powder, this finished reaction product made from filler and organosilane is resuspended in water, and this suspension is combined with the rubber emulsion, and the latex/the rubber emulsion is coagulated with the aid of acids.

The many steps needed for pre-treatment of raw materials prior to preparation of a rubber powder make this a complicated and therefore expensive process. Furthermore, the dry silanization process mentioned is not applicable when the preliminary stages used for silica preparation are lower-cost methods, which are also of interest for application-related reasons, e.g. silica filtercake or indeed precipitation suspension. Any process for preparing rubber powder in these cases has to be one in which the organosilane is added directly during the process to prepare the rubber powder. DE 198 43 301.8 (starting from silica filtercake) and DE 100 56 696.0 (starting from silica precipitation suspension) describe these processes and the procedure needed for the same.

b) Polymerization in Organic Solvents

The second large group of rubbers is that of products polymerized in an organic solvent, in general by anionic methods, wherein the polymers are generally present in the organic solvent after the polymerization. Any process for preparing a rubber powder from solution polymers (dissolved in organic solvent) and fillers therefore has to consider the completely different nature of this form of rubber starting material.

Examples of important rubbers prepared in organic solvents are styrenebutadiene rubber based on solution polymerization (SSBR), butadiene rubber (BR), butyl rubbers, halobutyl rubbers, and also ethylene-propylene rubbers with (EPDM) or without (EPM) a copolymerized tercomponent.

The preparation of filled rubber powders from rubber solutions has also been described in detail in the patent literature, in principle using two different processes.

DE 21 35 266, DE 22 14 121, published patent applications 23 24 009, 23 25 554; 23 32 796; DE 26 54 358 and DE 24 39 237 describe processes in which the organic rubber solution is first converted into an aqueous emulsion, with the aid of large amounts of emulsifiers. The water moreover comprises some of the precipitating agent, generally sulfiric acid. The filler, generally carbon black, is suspended in water when added to this emulsion, and the entire emulsion is allowed to flow into a hot sodium water-glass solution. Coprecipitation of rubber and filler takes place with simultaneous removal of the solvent. The preparation process is therefore very closely related to the processes for preparing rubber powders using aqueous polymer systems, and is based on the principle of coagulation via acid addition. The use of large amounts of emulsifiers serves to raise the level of phase incompatibility between organic polymer solution and aqueous filler suspension. The patent specifications relate almost exclusively to carbon-black-filled systems. Silica-containing products are merely mentioned in passing, and the above patents do not include methods of using organosilanes, although these are of vital importance for the subsequent application of silica-filled systems, at least in high-performance rubber mixtures. In the light of experience (U. Görl, J. Müinzenberg, D. Luginsland, A. Müller, Kautsch. Gummi Kunstst. 52 (1999) 588) moreover, the organosilane would not survive the selected process and the extreme experimental conditions (sulfuric acid, hot alkali metal silicate solution) without irreversible damage to its molecular structure.

Published patent application 22 60 340 describes a clearly different process in which the rubber solution is mixed with the filler and then the solvent is flash-evaporated by depressurization. The temperatures used reach up to 285° C., and all the temperatures in the examples section are also at least 150° C.

The process is therefore clearly geared to the use of carbon black fillers. The use of silicas combined with organosilanes is impossible with this process, for reasons associated with the thermal stability of the silane.

Since the start of the 1990s, there has been increasing use of highly silica-filled/organosilane-containing rubber mixtures in car tire treads, the intention being to reduce the rolling resistance of the tire and thus reduce fuel consumption (EP 0 501 227, U.S. Pat. No. 5,227,425; G. Agostini, J. Bergh, Th. Materne, October 1994 Akron, Ohio/USA; U. le Maitre, The Tire Rolling Resistance, Tyre Tech '92 Conference, Paris/France 1992). At the same time, these mixtures for tires have markedly improved wet skid resistance and better winter performance. According to the present state of knowledge, the only way of obtaining the combination of these desired tire properties, which also includes improvements in tire abrasion resistance and therefore an increase in tire life, is to bring together a highly silica-filled filler/silane system and the use of new rubbers 5 based on high-vinyl-content SSBR grades, blended with butadiene rubber. In order, inter alia, to be able to produce specifically these systems based on SSBR and, respectively, BR/silica/silane in the form of rubber powders with the desired tire properties, there is a need for new developments and preparation methods not described in the patent literature to date.

The silica/silane system as employed and processed by the user in the processes currently used in the rubber industry, starting from bale rubber and silica filler, generally in pelletized form, and direct addition of the silane in the kneading process, poses numerous problems for the compounder, including some which have not yet satisfactorily been solved (A. Hunsche, U. Görl, A. Mueller, Kautsch. Gummi Kunstst. 50 (1997) 881; A. Hunsche, U. Görl, G. Koban, Th. Lehmann, Kautsch. Gummi Kunstst. 51 (1998) 525; S. Wolf, Theoretical and Practical Aspects of Si 69 Application with Silica Containing Compounds, PR1 Meeting, New Delhi, December 1982).

Firstly, the compounder having an internal mixer is not used for its intended purpose which is the incorporation and intimate mixing of various constituents of a mixture, and also increasing the level of interaction between rubber and filler, this interaction being needed for the eventual property profile. Rather the compounder is used as a sort of chemical reactor. During the mixing process it has to carry out a reaction between silica and organosilane with elimination and liberation of large amounts of ethanol (S. Wolf, Theoretical and Practical Aspects of Si 69 Application with Silica Containing Compounds, PR1 Meeting, New Delhi, December 1982). The correct conduct of this reaction is a decisive factor for the eventual properties of the finished rubber product. Theoretical and practical studies have shown that this reaction between filler and organosilane, like every chemical reaction, needs a certain reaction time, which can be expressed using kinetic variables, such as reaction rate and activation energy (A. Hunsche, U. Görl, A. Müeller, Kautsch. Gummi Kunstst. 50 (1997) 881; A. Hunsche, U. Görl, G. Koban, Th. Lehmann, Kautsch. Gummi Kunstst. 51 (1998) 525; U. Görl, A. Parkhouse, Kautsch. Gummi Kunstst. 52 (1999) 493). Now, the user of the silica/silane system is aware that the reaction time for complete reaction of the two reaction partners (bonding of the silane to the silica surface) under the conditions prevailing in an internal mixer is markedly longer than the time otherwise needed for the usual incorporation of the filler into the rubber matrix, with the subsequent dispersion step. In other words, the mixing process has to be lengthened excessively due to the slow, reaction between silica and silane. In current practice, the mixing time for silica/silane-filled rubber systems is from 12 to 15 minutes, whereas the mixing time for a carbon-black-filled standard system is estimated at about 5 minutes at most.

SUMMARY OF THE INVENTION

It is an object of the present invention to produce a rubber powder from a rubber solution and from a silicatic filler, in particular from a precipitated high-activity silica. It is another object of the present invention to the silicatic filler as specified. Yet another object of the invention is the reaction of the silicatic filler with an organosilane. In other words, the finished rubber powder must comprise the silica/silane system with the silanization reaction completed. Only then will the user receive a product in the form of a pulverulent rubber/silica/silane composite which meets his application related requirements for this class of product. The most important processing requirements here are satisfactory capability for conveying and silo storage, good processibility, short mixing times and a small number of stages of mixing, and thus reduced energy usage and increased mixing capacity.

Factors which should be mentioned in relation to workplace health and safety are reduced dust emission and avoidance of ethanol evolution during the silanization reaction.

In addition, vulcanization-related properties have to be at least comparable with the current standard.

This and other objects have been achieved by the present invention the first embodiment which includes a process for preparing a fine-particle rubber powder, comprising:

a) suspending 1) one or more silicatic fillers and one or more bifunctional organosilicon compounds or 2) a silicatic filler modified with an organosilicon compound in water, thereby obtaining a suspension;

b) adjusting a pH of the suspension to 5 to 10;

c) adding one or more rubbers in an organic solvent to the suspension;

d) removing the organic solvent, thereby obtaining rubber powder in water;

e) removing most of the water from the rubber powder then present in water; and f) adjusting a residual moisture level of the rubber powder to <2%, thereby obtaining said fine-particles rubber powder;

wherein said rubbers are prepared by solution polymerization and/or from rubber present in the organic solvent.

DETAILED DESCRIPTION OF THE INVENTION

The rubber powder of the present invention is a composite system composed of 1) a rubber prepared by solution polymerization, of 2) a silicatic filler, in particular precipitated high-activity silica, and of 3) an organosilane which contains trialkoxysilyl groups and is therefore reactive toward silica. The complicated and complex nature of the preparation of this rubber powder stems from the fact that the three separate components have different polarity and therefore different levels of phase compatibility and/or are present in media (organic solvent and, respectively, water) which in some cases further amplify these polarity differences and this incompatibility.

Solution rubbers, e.g. SSBR, BR, EPDM, and halobutyl, are generally polymerized in non-polar solvents, such as cyclohexane or heptane, or else toluene and/or benzene. The rubbers form a non-polar single-phase system with the respective organic solvent.

The silicatic fillers used for preparing the rubber powders, in particular precipitated silicas, have silanol groups on their surface. These are therefore polar products. An additional factor is that all silicas comprise variable amounts of adsorbed water bound to the surface. The amount of water is particularly considerable when the starting materials used are silicas from preliminary stages of the preparation process, e.g. salt-free washed filtercake or precipitation suspension.

Dried silica, whether premodified using silane or not, generally comprises from 4 to 8% of adsorptively bound water.

In the case of salt-free washed filtercake, the preliminary stage prior to silica drying, the water content is about 80%, mostly within the silica structure.

When silica precipitation suspension is used, this being the stage preceding the filtercake, the water content value is from 90 to 95%. From what has been said it is clear that when the rubber solution described above is blended with the silica suspension at the start of preparation of a pulverulent rubber/filler composite the mixture always has two phases.

The rubber powders of the invention are prepared using one or more organosilicon compounds of the general formula:

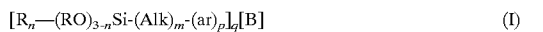

$$[R_n-(RO)_{3-n}Si-(Alk)_m-(ar)_pl_q[B] \quad (I)$$

$$R^1{}_n-(RO)_{3-n}Si-(alkyl) \quad (II)$$

or $$R^1{}_n-(RO)_{3-n}Si-(alkenyl) \quad (III)$$

where:

| | |
|---|---|
| B | is —SCN, —SH, —Cl, —NH$_2$ (if q = 1) or -S$_x$- (if q = 2); |
| R and R$^1$ | are an alkyl group having from 1 to 4 carbon atoms, branched or unbranched, or the phenyl radical, and the meaning of each R and R' may be the same or different; |
| n | is 0, 1 or 2; |
| alk | is a straight-chain or branched bivalent hydrocarbon radical having from 1 to 6 carbon atoms; |
| m | is 0 or 1; |
| ar | is an arylene radical having from 6 to 12 carbon atoms; |
| p | is 0 or 1 with the proviso that p and n are not simultaneously 0; |
| x | is a number from 2 to 8; |
| alkyl | is a straight or branched saturated monovalent hydrocarbon radical having from 1 to 20 carbon atoms, preferably from 2 to 8 carbon atoms; and |
| alkenyl | is a straight or branched unsaturated monovalent hydrocarbon radical having from 2 to 20 carbon atoms, preferably from 2 to 8 carbon atoms. |

The members of the group whose use is currently most important in the rubber industry, for example bis(triethoxysilylpropyl) tetra- or disulfane (U. Görl, Gummi, Fasern, Kunstst. 51 (1998)$_{4-16}$) and mercaptopropyltrialkoxysilane, and thiocyanatopropyltriethoxysilane are relatively non-polar and therefore almost insoluble in water. However, the silane is intended to link chemically or adsorptively to the silica present in suspension in water, but this is impossible due to phase incompatibility between silane and silica in the water.

Fine-particle rubber powders can be prepared by the process according to the present invention. These fine-particle rubber powders are composed of one or more silicatic fillers, of one or more bifunctional organosilanes, and of one or more rubbers, and are prepared by solution polymerization, and/or from rubber present in an organic solvent, wherein:

a) the silicatic filler(s) and the organosilicon compound(s) are emulsified in water, directly or after modification, optionally in the presence of a surface-active substance and/or, optionally, of one or more substances which activate(s) the surface of silica;

b) in a pH range from 5 to 10, preferably from 6 to 8, the resultant suspension is treated with a rubber emulsion, and, where appropriate, the pH of the mixture is adjusted to a value of from 2 to 7, preferably from 4 to 5, by means of a Brönsted or Lewis acid;

c) the mixture prepared in a) or in a) and b) is heated for from 5 to 120 min, preferably from 20 to 40 min, at a temperature of from 30 to 90° C., preferably from 50 to 80° C.;

d) the polymer in the organic solvent is then added to the filler suspension prepared in a) and, where appropriate, b) and c);

e) the organic solvent is then removed in a manner which is usual in chemistry;

f) most of the water from the rubber powder then present in water is removed, using conventional methods of solid/liquid separation;

g) where appropriate, suitable granulation techniques are used to convert the product to particulate form (there being machinery marketed for this purpose); and h) the residual moisture level of the product is adjusted by conventional drying methods to from 0 to 5 wt. %, in particular <2 wt. %.

The pH range of the suspension in step b) includes all values and subvalues therebetween, especially including 5.5, 6, 6.5, 7, 7.5, 8, 8.5, 9 and 9.5.

The pH of the mixture in step b) includes all values and subvalues therebetween, especially including 2.5, 3, 3.5, 4, 4.5, 5, 5.5, 6 and 6.5.

The heating time in step c) includes all values and subvalues therebetween, especially including 10, 20, 30, 40, 50, 60, 70, 80, 90, 100 and 110 min.

The temperature in step c) includes all values and subvalues therebetween, especially including 35, 40, 45, 50, 55, 60, 65, 70, 75, 80 and 85° C.

The process of the invention can prepare a free-flowing rubber powder composed of solution rubber, and of silicatic filler and organosilane, each in the desired ratio by weight. The manner in which the types of raw starting material with their phase incompatibility or their opposing compatibility are ordered in this process is such that during the preparation of the rubber powder of the invention the silane first becomes distributed uniformly on the silica, and reacts chemically in the course of the preparation process. At the same time the polymer becomes bound adsorptively onto this silica/silane complex, again with the uniformity required. Only if the operation of the current mixing process in the kneader is transferred to a chemical reactor, as used in the rubber powder preparation process, is it possible for the vulcanization-related properties achievable using the rubber powder of the present invention at least to equal those obtained from the above-mentioned conventional mixing method.

The invention provides a process for preparing fine-particle rubber powders from a silica/silane suspension or from another silicatic filler in water and from a rubber solution in an organic solvent.

The process comprises preparing the rubber/silicatic filler/organosilane composite by transfer from a two-phase system into a single-phase system.

The process comprises introducing the silicatic filler and the organosilane separately within the rubber powder preparation process.

The process comprises homogenizing the silicatic filler and organosilane intimately with one another in water, where appropriate in the presence of surface-active substances, preferably non-ionic, cationic, or anionic surfactants, whose concentration in the emulsion is from 0.1 to 2 wt. %, preferably from 0.2 to 1 wt. %, based on the filler content. The concentration of the surface active substrates includes all values and subvalues therebetween, especially including 0.2, 0.4, 0.6, 0.8, 1.0, 1.2, 1.4, 1.6 and 1.8 wt. % based on the filler content.

Preferred examples of surfactants are alkylphenol polyglycol ethers, polyglycols, alkyltrimethylammonium salts, dialkyldimethylammonium salts, alkylbenzyltrimethylammonium salts, alkylbenzenesulfonates, alkyl hydrogensulfates and alkyl sulfates.

Optionally, the process comprises adding, to the filler suspension, from 0.3 to 9 wt. % based on the filler, preferably from 3.5 to 6.5 wt. %, of substances which destabilize the silica network and weaken hydrogen bonds. The amount of added substance includes all values and subvalues therebetween, especially including 0.5, 1.0, 1.5, 2.0, 2.5, 3.0, 3.5, 4.0, 4.5, 5.0, 5.5, 6.0, 6.5, 7.0, 7.5, 8.0 and 8.5 wt. %. These substances can be termed filler activators.

Preferred members of this group of compounds are found in the class consisting of the polyalcohols and amines.

Particularly preferred members of this class, which are also often used in the rubber industry as secondary accelerators in silica-containing mixtures, are: diethylene glycol (DEG), polyethylene glycol (PEG), polywaxes, triethanolamine (TEA), diphenylguanidine (DPG), and di-o-tolylguanidine (DOTG).

The process comprises heating the filler/organosilane suspension in the presence or absence of the abovementioned additives, where appropriate for from 5 to 120 min, preferably from 20 to 40 min, at temperatures of from 30 to 90° C., preferably from 50 to 80° C.

The process comprises, where appropriate, adding small proportions of a rubber emulsion to the filler/silane suspension. However, the proportion of these, based on the entirety of the rubber, is not more than 15 phr and is generally ≦5 phr. The proportion of the rubber emulsion includes all values and subvalues therebetween, especially including 5.5, 6, 6.5, 7, 7.5, 8, 8.5, 9, 9.5, 10, 10.5, 11, 11.5, 12, 12.5, 13, 13.5, 14 and 14.5 phr.

The process comprises, where appropriate, lowering the pH to values of from 2 to 7, preferably from 4 to 5, after addition of the aqueous rubber emulsion, with coagulation. Commonly used Brönsted or Lewis acids are used for this purpose, preferably $Al_2(SO_4)_3$.

The addition of the rubber emulsion and the coagulation of the same may take place prior to or after the heating process, preferably prior to the heating of the filler/silane suspension.

The process comprises reacting silicatic filler and organosilane chemically, with liberation of alcohol, during the rubber powder preparation process.

A preferred embodiment of the process comprises using an organosilane already chemically reacted with the silicatic filler to give what is known as a presilanized filler and incorporating this reaction product into the rubber powder preparation process.

The process comprises preparing the rubber/filler/silane composite by transfer from a two-phase system into a single-phase system, by a method not involving joint acid-catalyzed coagulation of the rubber initially present in the organic solvent and of the filler/silane suspension present in water. The process comprises forming the actual rubber/silicatic filler/organosilane composite in the aqueous phase.

Other constituents which are usually used in a finished rubber mixture may be added to the preparation process for the rubber powder. Preferred examples are: mineral plasticizers, industrial carbon blacks with various surface areas (iodine adsorption) and structures (DBP value), pale non-silicatic fillers (e.g. chalks), processing aids, activators, antioxidants, and crosslinking chemicals, the concentrations being those usual for applications.

The process comprises using suitable methods of solid/liquid separation to isolate the rubber/silicatic filler/organosilane composite present in the water from most of the process water.

The process comprises converting the moist product cake, where appropriate using well-known techniques for shaping of adhesive paste products into particulate marketable forms which are—in particular after drying—free-flowing, and also capable of conveying and silo storage.

The process comprises using conventional drying methods to dry the product to a residual moisture content of about 2 wt. %, after the shaping process.

Depending on the nature of the raw material, the process comprises using two different general methods to prepare the silica-silane suspension.

a) Use of Presilanized Silicatic Filler

The silane-modified reaction product obtained in advance from a chemical reaction between a silicatic filler and an organosilane is suspended in water with the aid of a stirrer unit at a temperature of from 10 to 60° C., preferably room temperature. The temperature includes all values and subvalues therebetween, especially including 15, 20, 25, 30, 35, 40, 45, 50 and 55° C. The solids content of the suspension here may vary from 0.5 to 15 wt. %, preferably from 5 to 12 wt. %, the upward limit being broadly determined by the pumpability of the suspension, and the lower limit being broadly determined by the need for a space-time yield which gives acceptable production technology and production costs. The solids content of the suspension includes all values and subvalues therebetween, especially including 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14 and 14.5 wt. %. Up to 15 phr, preferably <5 phr, of a rubber (latex) emulsion may be added to the resultant filler suspension, which may be coagulated using a Brönsted or Lewis acid. The amount of rubber (latex) emulsion includes all values and subvalues therebetween, especially including 6, 7, 8, 9, 10, 11, 12, 13 and 14 phr. The application of a thin rubber layer leads to better binding of the solution polymer during the subsequent course of the preparation of the rubber powders of the invention. The extent to which this measure is needed mainly depends on the amount of silane bonded on the filler. Relatively large amounts of silane mean that no, or only very small amounts of, coagulation product is/are needed on the surface, while relatively small amounts of silane mean that correspondingly more is required. Finally, the filler surface has to be hydrophobicized to a certain extent to accept the solution polymer. Silane and coagulation rubber are used for this purpose. This means that the amount of each of these agents is also always dependent on the amount of the other. However, since the amount of the organosilane is decisive for eventual vulcanization-related properties, this provides the baseline to which the amount of the coagulation rubber is then adapted.

Among particularly preferred emulsion rubbers for this hydrophobicization step, mention should be made of ESBR and NR, since they generally also have good compatibility with the most important solution rubbers subsequently to be applied to the filler.

The pH values set during this filler/silane surface-modification step are from 2 to 7, preferably from 4 to 5. The pH includes all values and subvalues therebetween, especially including 2.5, 3, 3.5, 4, 4.5, 5, 5.5, 6 and 6.5.

The rubber dissolved in the organic solvent is added, all at once or stepwise, under atmospheric or superatmospheric pressure, to the resultant or prepared filler suspension, composed of a silicatic filler and of an organosilane previously reacted with the same. The temperature of the filler suspension here may be within a range from 10 to 100° C., preferably from 20 to 60° C. The temperature includes all values and subvalues therebetween, especially including 15, 20, 25, 30, 35, 40, 45, 50, 55, 60, 65, 70, 75, 80, 85, 90 and 95° C. If the temperatures are higher than room temperature, commonly used measures have to be used to bring the filler suspension to the desired temperature in advance.

Finally, the organic solvent is drawn off under constant stirring. The temperature of the reaction mixture here has, of course, to have regard to the pressure-dependent boiling point of the solvent. In one preferred embodiment, the solvent is removed more rapidly from the reaction vessel by also applying a vacuum. Commonly used distillation processes may be employed.

A decisive factor in this step of the process is the continuous transfer of the solution polymer into the aqueous phase in which, as described above, the prepared filler suspension is present. The solution polymer initially present in the solvent becomes adsorbed onto the filler, thus gaining a grain-like structure which is a function, inter alia, of the filler particles, but also of other preparation parameters, e.g. the energy introduced by the stirrer and the shape of the stirrer.

Once the solvent has been removed, the remaining aqueous phase, which comprises the entire product, is freed from most of the water by a filtration process. The solid/liquid separation process may be carried out with the aid of known methods.

Further preferred are filtration via a Büchner funnel, and also the use of a centrifuge or of a filter press. After the solid/liquid separation there may be a need for another optimization of grain shape, in order subsequently to give a free-flowing rubber powder. Conventional granulation techniques are used for this purpose. The process concludes by drying the product by means of known drying processes, and particular preference is given to the use of a convection dryer or contact dryer. It is important that the temperature to which the product is exposed causes no thermal degradation of the organosilane or of the rubber. Drying temperatures which have therefore proven particularly suitable are those in the range from 80 to 140° C., in particular from 100 to 120° C. The drying temperature includes all values and subvalues therebetween, especially including 90, 100, 110, 120, and 130° C.

b) Process Using Silicatic Filler and Organosilanes

The preparation of the filler/silane suspension differs from a) as follows: the silicatic filler, the organosilane, and silica activator, in amounts of from 0.3 to 9 wt. %, based on the filler, preferably from 3.5 to 6.5 wt. %, and from 0.1 to 2 wt. % of surfactants, preferably from 0.2 to 1 wt. %, based on the filler content, are suspended in water to give a solids content of from 0.5 to 15 wt. %, preferably from 5 to 12 wt. %, in the suspension. The amount of the silicatic filler, the organosilane and the silica activator includes all values and subvalues therebetween, especially including 0.5, 1, 1.5, 2, 2.5, 3, 3.5, 4, 4.5, 5, 5.5, 6, 6.5, 7, 7.5, 8 and 8.5 wt. % based on the filler. The amount of surfactant includes all values and subvalues therebetween, especially including 0.2, 0.4, 0.6, 0.8, 1.0, 1.2, 1.4, 1.6 and 1.8 wt. % based on the filler content. The solids content includes all values and subvalues therebetween, especially including 1, 2, 3, 4, 5, 6, 7, 8, 9, 10, 11, 12, 13 and 14 wt. %.

Optionally, this is followed by setting the pH of the suspension within the range from 5 to 10, preferably from 6 to 8, by adding a solution of an alkali metal hydroxide, preferably NaOH. The pH includes all values and subvalues therebetween, especially including 5.5, 6, 6.5, 7, 7.5, 8, 8.5, 9 and 9.5. Where appropriate, the suspension is then treated with a rubber (latex) emulsion making up not more than 15 phr, preferably not more than 5 phr, of the total amount of rubber. The pH of the suspension is then adjusted to a value of from 2 to 7, preferably from 4 to 5, using an acid, preferably $Al_2(SO_4)_3$, and the entire mixture is heated for from about 5 to 120 min, preferably from 20 to 40 min, at a temperature of from 30 to 90° C., preferably from 50 to 80° C. The pH includes all values and subvalues therebetween, especially including 2.5, 3, 3.5, 4, 4.5, 5, 5.5 and 6.5. The heating time includes all values and subvalues therebetween, especially including 10, 20, 30, 40, 50, 60, 70, 80, 90, 100 and 110 min. The temperature includes all values and subvalues therebetween, especially including 35, 40, 45, 50, 55, 60, 65, 70, 75, 80 and 85° C.

The polymer dissolved in organic solvent is then added to the suspension, and the remaining sequence of preparation and workup is carried out as in a). In this case the organosilane reacts with the silanol groups of the silicatic filler during the drying of the rubber powder of the invention.

The natural or precipitated silicatic fillers (inter alia, silica fillers), which may be in the form of a mixture of two or more of these fillers, and which are present in the rubber powders of the invention are fillers known per se in rubber technology. A substantive precondition for their suitability is the presence of silanol groups on the surface of the filler particles, which can react with the alkoxy groups of the organosilicon compounds. These are oxidic and silicatic fillers which are compatible with rubbers and which have the fine-particle nature which is needed and known for this use.

Particularly preferable naturally occurring silicates are kaolins and clays, but use may also be made of kieselguhr or diatomaceous earth.

Silicatic fillers are generally classified according to their nitrogen surface area (to ISO 5794/1D) as a measure of their activity, and according to their structure (DBP value) to ASTM D2412.

The fillers used are products in the surface area range from 1 to 1000 m$^2$/g, preferably from 100 to 250 m$^2$/g, and in the structural range from 150 to 400 ml/100 g, preferably from 200 to 300 ml/100 g (DBP value). The surface area of the filler includes all values and subvalues therebetween, especially including 100, 200, 300, 400, 500, 600, 700, 800, and 900 m$^2$/g. The DBP value includes all values and subvalues therebetween, especially including 200, 250, 300, and 350 ml/100 g.

The rubber powders of the invention comprise the silicatic fillers in pure form or as a mixture of two or more products, in amounts of from 5 to 300 phr, preferably from 20 to 85 phr. The amount of silicate filler includes all values and subvalues therebetween, especially including 20, 40, 60, 80, 100, 120, 140, 160, 180, 200, 220, 240, 260 and 280 phr.

The rubber powders of the invention are prepared using one or more organosilicon compounds of the general formula I to III $$[R_n—(RO)_{3-n}Si\text{-(alk)}_m\text{-(ar)}_p]_q[B] \quad (I)$$

$$R^1{}_n—(RO)_{3-n}Si\text{-(alkyl)} \quad (II)$$

or $$R^1{}_n—(RO)_{3-n}Si\text{-(alkenyl)} \quad (III)$$

where:

| | |
|---|---|
| B | is —SCN, —SH, —Cl, —NH$_2$ (if q = 1) or -Sx- (if q = 2); |
| R and R$^1$ | are an alkyl group having from 1 to 4 carbon atoms, branched or unbranched, or the phenyl radical, and the meaning of each R and R' may be the same or different; |
| n | is 0, 1 or 2; |
| alk | is a straight-chain or branched bivalent hydrocarbon radical having from 1 to 6 carbon atoms; |
| m | is 0 or 1; |
| ar | is an arylene radical having from 6 to 12 carbon atoms; |
| p | is 0 or 1 with the proviso that p and n are not simultaneously 0; |
| x | is a number from 2 to 8; |
| alkyl | is a straight or branched saturated monovalent hydrocarbon radical having from 1 to 20 carbon atoms, preferably from 2 to 8 carbon atoms; and |
| alkenyl | is a straight or branched unsaturated monovalent hydrocarbon radical having from 2 to 20 carbon atoms, preferably from 2 to 8 carbon atoms. |

Preferred examples of organosilanes are those which may, for example, be prepared as in Belgian patent 787691: bis(trialkoxysilylalkyl) oligosulfides, such as bis (trimethoxy-, -triethoxy-, -dimethoxyethoxy-, -tripropoxy-, -tributoxy-, -triisopropoxy-, and -triisobutoxysilylmethyl) oligosulfides and in particular specifically the di-, tri-, tetra-, penta-, and hexasulfides, etc., and also bis(2-trimethoxy-, -triethoxy-, -dimethoxyethoxy-, -tripropoxy- and -tri-n- and -isobutoxysilylethyl) oligosulfides, and in particular specifically the di-, tri-, tetra-, penta-, and hexasulfides, etc., and moreover the bis(3-trimethoxy-, -triethoxy-, -dimethoxyethoxy-, -tripropoxy- and -tri-n- and -isobutoxysilylpropyl) oligo sulfides, and in turn specifically the di-, tri-, and tetrasulfides, etc., up to octasulfides, and also the corresponding bis(3-trialkoxysilylisobutyl) oligosulfides, and the corresponding bis(4-trialkoxysilylbutyl) oligosulfides. Among these selected organosilanes of relatively simple structure and having the general formula I, preference is given to the bis(3-trimethoxy-, -triethoxy-, and tripropoxysilylpropyl) oligosulfides, and specifically to the di-, tri-, tetra-, and pentasulfides, in particular to the triethoxy compounds having 2, 3, or 4 sulfur atoms, and mixtures of these. Other particularly preferred silanes are those having the following structural formula:

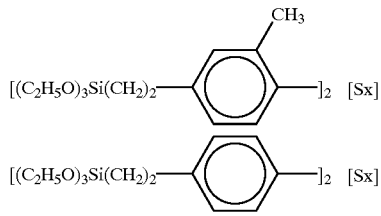

The silane may have already been reacted chemically with the filler, or be added to the process in the form of free silane. In the latter case, the silane reacts with the silicatic filler with elimination of alcohol during the drying of the rubber powder.

The amount of the organosilane used in pure form or as a mixture of two or more organosilanes depends firstly on the nature and amount of the silicatic filler used and secondly on the desired application-related properties. Based on 100 parts of silicatic filler, it is from 0.5 to 15 wt. %, in particular from 5 to 10 wt. %. The amount of organosilane includes all values and subvalues therebetween, especially including 1, 2, 3, 4, 5, 6, 7, 8, 9, 10, 11, 12, 13 and 14 wt. %.

It has been found that the following rubbers can be used, individually or in a mixture, after polymerization in organic solvent: styrene-butadiene rubber with styrene contents of from 10 to 30 wt. %, and also with contents of from 20 to 55 wt. % of 1,2-vinylbutadiene, and isoprene rubber, in particular 3,4-polyisoprene, and also butadiene rubber with 1,4-cis configuration ≦90 wt. %, polypentenamer rubber, polyoctenamer rubber, and polynorbornene rubber, butyl rubber, or halobutyl rubber having chlorine or bromine as halogen atom, ethylene-propylene (EPM) or ethylenepropylene-diene (EPDM) rubbers having the usual composition with regard to ethylene or propylene content. The styrene content in the styrene-butadiene rubber includes all values and subvalues therebetween, especially including 12, 14, 16, 18, 20, 22, 24, 26 and 28 wt. %. The content of 1,2 vinylbutadiene in the styrene-butadiene rubber includes all values and subvalues therebetween, especially including 25, 30, 35, 40, 45 and 50 wt. %. The same applies in the case of EPDM with regard to the nature and amount of the tercomponent, hydrogenated nitrite-butadiene rubber (HNBR), and also ethylene-vinyl acetate copolymers. The process of the invention is also suitable when rubbers prepared in other media (e.g. in water or in the gas phase) are then dissolved in a suitable organic solvent.

Besides the abovementioned silicatic fillers, the rubber powders of the invention may, comprise other fillers. These are primarily the industrial carbon blacks commonly used in the rubber industry, with various surface areas and structures. Use may moreover be made of other, generally naturally occurring, fillers which contain no silicatic groups on the surface, e.g. chalks.

The preparation process of the invention may also be used to introduce, into the rubber powder of the invention, other auxiliaries and additives usually used in the rubber industry. These include mineral oil plasticizers, processing aids, vulcanizing agents, such as zinc oxide, zinc stearate, stearic acid, antioxidants, resins, and flame retardants, e.g. $Al(OH)_3$ and $Mg(OH)_2$, pigments, various crosslinkers, and sulfur, in the concentrations conventional in rubber technology.

The invention succeeds in preparing fine-particle rubber powder comprising silicatic fillers modified with organosilicon compounds, the rubber powder being free-flowing and also remaining free flowing after exposure to mechanical stress (e.g. conveying, packing). These then give the fine-particle rubber powders which are easy to process and then produce vulcanizates with improved properties.

Having generally described this invention, a further understanding can be obtained by reference to certain specific examples which are provided herein for purposes of illustration only, and are not intended to be limiting unless otherwise specified.

EXAMPLE

Chemicals used for preparing the rubber powders of the invention:

Buna VSL 5025 in cyclohexane

Solution styrene-butadiene rubber (Bayer AG);

Buna CB 24 in cyclohexane

Butadiene rubber (Bayer AG);

ESBR latex Emulsion styrene-butadiene rubber in water (DOW);

Coupsil 8113

Silane-modified silica (Ultrasil VN3/Si 6911.4%) (Degussa AG);

Coupsil 8108

Silane-modified silica (Ultrasil VN3/Si 69 7.25%) (Degussa AG);

Ultrasil 7000

High-dispersion precipitated silica with an $N_2$ surface area of 180 $m^2/g$ (Degussa AG);

Ultrasil 7000 filtercake

High-dispersion precipitated silica with an $N_2$ surface area of 180 $m^2/g$ in the form of filter cake (Degussa AG);

Ultrasil 7000 precipitation suspension

High-dispersion precipitated silica with an $N_2$ surface area of 180 $m^2/g$ in the form of precipitation suspension (Degussa AG);

Si 69

Bis(triethoxysilylpropyl) tetrasulfane, organosilane for the rubber industry (Degussa AG);

Si 75

Bis(triethoxysilylpropyl) disulfane, organosilane for the rubber industry (Degussa AG);

DEG

Diethylene glycol; and

Marlipal 1618/25

Fatty alcohol polyethylene glycol ether (Condea).

1. Preparation of a Rubber Powder Based on BR and Coupsil 8113

80 g of Coupsil 8113 were suspended in water, with stirring. The solids content of this suspension was about 6 wt. %. 22.8 g of ESBR latex (solids content 21.9 wt. %) were then added to the suspension, and the pH of the ESBR/Coupsil mixture was lowered to 4 by means of an $Al_2(SO_4)_3$ solution (10% strength).

1 900 g of polybutadiene rubber solution (in cyclohexane, 5% strength) were added to the filler suspension, with continuous stirring, and the organic solvent (cyclohexane) was then distilled off at about 80° C. at atmospheric pressure.

Once the reaction ended, the BR/Coupsil intermediate product present in water was freed from most of the water by a filtration process (e.g. Büchner funnel), then converted into granular form by way of a screen, and dried in a laboratory dryer to moisture content of about 2%.

Thermogravimetric analysis of the dried product gave a residue attributable to the silica of 41.56 wt. %, corresponding to a filler level of about 73 phr (theoretically 72 phr). The value shows that the silanized silica had been completely absorbed by the BR rubber matrix. It was therefore possible to prepare a rubber/silica/silane composite system for supply as a rubber powder.

2. Preparation of a Rubber Powder Based on SSBR and Coupsil 8113

The procedure corresponds to that of experiment 1.

The materials used this time were:

40 g of Coupsil 8113 suspended in water;

12.4 g of ESBR 1500 as latex (solids content 23.4 wt. %); and 950 g of SSBR dissolved in cyclohexane (5% strength).

TGA of the dried rubber powder gave a value of 40.41% for silica and therefore a solids content of 71 phr (theoretically 72 phr).

The silica was thus completely bound into the SSBR matrix, giving a free flowing rubber powder.

3. Preparation of a Rubber Powder Based on BR and Coupsil 8108

The procedure corresponds to that of experiment 1.

The materials used were:

43.2 g of Coupsil 8108 suspended in water;

12.4 g of ESBR 1500 as latex (solids content 23.4 wt. %); and 950 g of BR dissolved in cyclohexane (5% strength).

TGA of the dried rubber powder gave a value of 42.36% for silica and therefore a filler level of 79 phr (theoretically 80 phr).

Even with a reduced amount of silane, based on silica (low degree of 5 silanization) it was possible to prepare a rubber powder to specification. The silica was completely bound into the polymer.

4. Preparation of a Rubber Powder Based on SSBR, Ultrasil and Si 69

40 g of Ultrasil 7000 powder, 3.25 g of Si 69, 0.1 g of Marlipal 1618/25, and 1.5 g of diethylene glycol were suspended in water, with stirring.

After addition of 10.2 g of ESBR 1500 latex (solids 20.6%) a pH of 4 was set using $Al_2(SO_4)_3$ solution (10% strength), and the mixture was then heated at 80° C. for 40 min, with stirring.

950 g of SSBR dissolved in cyclohexane (5% strength solution) were then added to the filler suspension, and the organic solvent was distilled off, with stirring.

The residue present in water was filtered off, converted to a suitable form by way of a screen, and then dried in a laboratory dryer to about 2% moisture.

TG analysis of the rubber powder of the invention gave a solids content of 41.16 g, corresponding to a filler level of 72 phr (theoretically 72 phr).

Sulfur analysis, which gives the content of bound silane in the product, gave a value of 0.81% (theoretically 0.83%).

The results thus show that a rubber powder can be prepared from SSBR solution, silica powder, and organosilane, in which all of the filler and all of the silane used are in turn present in the product.

5. Preparation of a Rubber Powder Based on SSBR, Ultrasil 7000 Filtercake, and Si 69

The procedure corresponds to that of experiment 4.
The raw materials used were:

| | |
|---|---|
| Ultrasil 7000 filtercake | 237.3 g (22.9 wt. % solids); |
| SSBR in cyclohexane | 1 425 g (as 5% strength solution); |
| ESBR 1500 as latex | 15.7 g (23.8 wt. % solids); |
| DEG | 2.25 g; |
| Si 69 | 4.56 g; and |
| Marlipal 1618/25 | 0.14 g. |

The TGA value of the dried rubber powder was 42.47%, corresponding to a filler level of 74 phr (theoretically 72 phr). Sulfur analysis gave a value of 0.84% (theoretically 0.83%). The results show that a rubber powder can be prepared to specification starting from silica filtercake.

6. Preparation of a Rubber Powder Using BR, Ultrasil 7000 Filtercake and Si 75

The procedure corresponds to that of experiment 4.
The following raw materials were used:

| | |
|---|---|
| Ultrasil 7000 filtercake | 236 g (23.0 wt. % solids); |
| Polybutadiene rubber in cyclohexane; | 1425 g (as 5% strength solution); |
| ESBR 1500 as latex | 15.75 g (23.8 wt. % solids); |
| DEG | 2.25 g; |
| Si 75 | 4.5 g; and |
| Marlipal 1618/25 | 0.14 g. |

TG analysis of the product revealed a value of 41.42%. This corresponds to a filler level of 73 phr (theoretically 72 phr).

Sulfur analysis gave a value of 0.51% (theoretically 0.52%).

The process also gave a product to specification when Si 75 was used.

7. Preparation of a Rubber Powder Using SSBR, Ultrasil 7000 Precipitation Suspension and Si 75

A suspension was prepared using 670.6 g of Ultrasil 7000 precipitation suspension (solids content 8.5 wt. %), the pH of which had been adjusted in advance to a value of from about 6 to 7, 4.5 g of Si 75, 2.25 g of DEG, and 0.14 g of Marlipal, with stirring. The pH of the mixture was then adjusted to a value of about 10.0 by means of 2N NaOH. 18.2 g of ESBR latex (solids content 20.6 wt. %) were then added, and the pH was then lowered to a value of 4 ($Al_2(SO_4)_3$ addition). The mixture was then heated at 80° C. for about 40 min, and then treated with 1 250 g of 5% strength SSBR solution in cyclohexane.

The cyclohexane was distilled off with heating and stirring, and the residue present in water was transferred to a Büchner funnel.

After repeated washing of the filtercake, the product was converted into granular form using a screen, and then dried in a laboratory fluidized bed.

TG analysis revealed a value of 41.48%, and therefore a silica filler level of 72 phr (theoretically 72 phr).

Sulfur determination revealed a value of 0.50%, implying that all of the silane was present in the product (theoretically 0.52%).

The process of the invention can therefore also prepare a rubber powder to specification when silica precipitation suspension is used.

8. Preparation of a Rubber Powder Based on BR, Ultrasil 7000 Precipitation Suspension, and Si69

The procedure corresponds to that of experiment 7.
The following raw materials were used:

| | |
|---|---|
| Ultrasil 7000 precipitation suspension | 670.6 g (8.5% solids); |
| Polybutadiene rubber in cyclohexane | 1250 g (as 5% strength); |
| ESBR 1500 | 18.2 g (23.8 wt. % solids); |
| DEG | 2.25 g; |
| Si 69 | 4.9 g; and |
| Marlipal 1618/25 | 0.14 g. |

TG analysis of the rubber powder revealed a value of 40.6%, corresponding to a filler level of 71 phr (theoretically 72 phr).

Sulfur analysis gave a value of 0.82% (theoretically 0.83%).

The desired product can therefore be prepared to specification.

Application-Related Studies on the Rubber Powders of the Invention

Raw Materials Used:

Buna VSL 5025

Styrene-butadiene rubber based on solution polymerization (Bayer AG);

Buna CB 24

Butadiene rubber with 1,4-cis proportion >96 wt. % (Bayer AG);

Ultrasil 7000

High-dispersion precipitated silica with an $N_2$ surface area of 180 m²/g (Degussa AG);

Si 69

Bis(triethoxysilylpropyl) tetrasulfane, coupling agent for silica-containing rubber mixtures (Degussa AG);

Si 75

Bis(triethoxysilylpropyl) disulfane, coupling agent for silica-containing tire treads (Degussa AG);

Naftolen ZD

Aromatic mineral oil plasticizer;

Protector G35

Wax for protection against ozone;

Vulkacit D

Diphenylguanidine (Bayer AG); and

Vulkacit CZ

N-Cyclohexyl-2-benzothiazylsulfenamide.

Methods for vulcanization-related tests

| | | |
|---|---|---|
| Mooney viscosity ML 1 + 4 | [ME] | DIN 53 523/3 |
| Tensile strength | [MPa] | DIN 53 504 |
| 300% Modulus | [MPa] | DIN 53 504 |
| Elongation at break | [%] | DIN 53 504 |
| Shore hardness | [-] | DIN 53 505 |
| Abrasion | [mm³] | DIN 53 516 |
| Viscoelastic properties | [-] | DIN 53 513 |
| Dispersion (topography) | [%] | |

1. Comparison of Two Rubber Powders of the Invention Based on SSBR and BR Blended with Silica Filtercake The following rubber powders were used in comparison with the standard:

| | | |
|---|---|---|
| PIK I | SSBR* | 100 parts |
| | Ultrasil 7000 FK | 72 parts |
| | Si 69 | 6.4 parts |
| PIK II | BR** | 100 parts |
| | Ultrasil 7000 FK | 72 parts |
| | Si 69 | 6.4 parts |

*solution SBR 5025-0
**butadiene rubber CB 24

The products were prepared as described in Examples 5 and 6.

1a. Mixing Specification

Amounts given in parts by weight.

| | Standard | PK I/PK II |
|---|---|---|
| Buna VSL 5025-0 | 70 | — |
| CB 24 | 30 | — |
| PK I | — | 127.7 |
| PK II | — | 54.7 |
| Ultrasil 7000 GR | 80 | — |
| Si 69 | 6.4 | — |
| ZnO RS | 3 | 3 |
| Stearic acid | 2 | 2 |
| Naftolen ZD | 25 | 25 |
| Protector G 35 | 1 | 1 |
| Vulkacit D | 2 | 2 |
| Vulkacit CZ | 1.5 | 1.5 |
| Sulfur | 1.5 | 1.9 |

1b. Mixing Instructions

| | |
|---|---|
| GK 1.5 E internal mixer; friction 1:1; ram pressure 5.5 bar 70 RPM; chamber temp. 70° C.; batch temp. ≦ 150° | |
| 0–1' polymers | 0–2' PK, chemicals |
| 1–3' ½ silica, ZnO, stea., oil, Si 69 | 2' purging |
| 3–4' ½ silica, antioxidant | 2–4' mixing, var. of rotation rate |
| 4' purging | 4' discharge |
| 4.5' mixing | |
| 5' purging | |
| 5–6' mixing and discharge | |
| 80 RPM; chamber temp. 80° C.; batch temp. ≦ 150° C. | |
| 0–1' batch stage 1 plasticizing | |
| 2–5' mixing | |
| 5' discharge | |
| 40 RPM; chamber temp. 50° C.; batch temp. ≦ 110° C. | |
| 0–2' batch stage 2, crosslinking chemicals | |
| 2' eject then form milled sheet on roll | |

1c. Vulcanization-Related Data (Vulcanization Temperature 160° C.)

| Method | Unit | Standard | PK I/PK II |
|---|---|---|---|
| ML 1 + 4 | [ME] | 93 | 95 |
| Tensile strength | [MPa] | 13.4 | 15.8 |
| 300% Modulus | [MPa] | 8.9 | 8.4 |
| Elongation at break | [%] | 250 | 300 |
| Shore hardness | [-] | 63 | 66 |
| DIN abrasion | [mm³] | 55 | 49 |
| Disp. of peak area | [%] | 6.8 | 0.57 |
| tan δ 0° C. | [-] | 0.442 | 0.488 |
| tan δ 60° C. | [-] | 0.135 | 0.139 |

The rubber powders of the invention exhibit advantages in strength values and markedly better dispersion of the filler, despite shorter mixing time.

2. Comparison of Two Rubber Powders Based on SSBR and, Respectively, BR Blended With Silica Filtercake and Si 75

The following rubber powders were used in comparison with the standard:

| | | |
|---|---|---|
| PK III | SSBR* | 100 parts |
| | Ultrasil 7000 FK | 72 parts |
| | Si 75 | 6.4 parts |
| PK IV | BR** | 100 parts |
| | Ultrasil 7000 FK | 72 parts |
| | Si 75 | 6.4 parts |

*solution SBR 5025-0
**butadiene rubber CB 24

The products were prepared as described in Example 6.

2a. Mixing Specification

Amounts given in parts by weight.

| | Standard | PK III/PK IV |
|---|---|---|
| Buna VSL 5025-0 | 70 | — |
| CB 24 | 30 | — |
| PK III | — | 127.7 |
| PK IV | — | 54.7 |
| Ultrasil 7000 GR | 80 | — |
| Si 75 | 6.4 | — |
| ZnO RS | 3 | 3 |
| Stearic acid | 2 | 2 |
| Naftolen ZD | 25 | 25 |
| Protector G 35 | 1 | 1 |
| Vulkacit D | 2 | 2 |
| Vulkacit CZ | 1.5 | 1.5 |
| Sulfur | 2.1 | 2.1 |

2b. Mixing Instructions

Based on 1 b, using Si 75 instead of Si 69.

2c. Vulcanization-Related Data (Vulcanization Temp 160° C.)

| Method | Unit | Standard | PK III/PK IV |
|---|---|---|---|
| Tensile strength | [MPa] | 12.7 | 15.5 |
| 300% Modulus | [MPa] | 10.2 | 10.8 |
| Shore hardness | [−] | 67 | 64 |
| Elongation at break | [%] | 340 | 370 |
| Disp. of peak area | [%] | 5.5 | 0.3 |
| tan δ 60° C. | [−] | 0.140 | 0.138 |

The rubber powders of the invention exhibit advantages in strength values and markedly better dispersion of the filler, despite shorter mixing time.

3. Comparison of Two Rubber Powders of the Invention Based on SSBR and BR Blended with Silica Precipitation Suspension and Si 75

The following rubber powders were used in comparison with the standard:

| PK V | SSBR* | 100 parts |
|---|---|---|
| | Ultrasil 7000 FS | 72 parts |
| | Si 75 | 6.4 parts |
| PK VI | BR** | 100 parts |
| | Ultrasil 7000 FS | 72 parts |
| | Si 75 | 6.4 parts |

*solution SBR 5025-0
**butadiene rubber CB 24

The products were prepared as described in Example 7.

3a. Mixing Specification
Amounts given in parts by weight.

| | Standard | PK V/PK VI |
|---|---|---|
| Buna VSL 5025-0 | 70 | — |
| CB 24 | 30 | — |
| PK V | — | 127.7 |
| PK VI | — | 54.7 |
| Ultrasil 7000 GR | 80 | — |
| Si 75 | 6.4 | — |
| ZnO RS | 3 | 3 |
| Stearic acid | 2 | 2 |
| Naftolen ZD | 25 | 25 |
| Protector G 35 | 1 | 1 |
| Vulkacit D | 2 | 2 |
| Vulkacit CZ | 1.5 | 1.5 |
| Sulfur | 2.1 | 2.1 |

3b. Mixing Instructions
See Example 2b.

3c. Vulcanization-Related Data (Vulcanization Temperature 160° C.)

| Method | Unit | Standard | PK V/PK VI |
|---|---|---|---|
| Tensile strength | [MPa] | 12.7 | 14.7 |
| 300% Modulus | [MPa] | 10.2 | 10.1 |
| Elongation at break | [%] | 340 | 380 |
| Shore hardness | [−] | 67 | 66 |
| Disp. of peak area | [%] | 5.5 | 0.5 |
| tan δ 60° C. | [−] | 0.144 | 0.137 |

The rubber powders of the invention exhibit advantages in strength values and in dispersion.

German patent application 101 17 804.2, filed Apr. 10, 2001, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A process for preparing a fine-particle rubber powder, comprising:
    a) suspending 1) one or more silicatic fillers and one or more bifunctional organosilicon compounds or 2) a silicatic filler modified with an organosilicon compound in water, thereby obtaining an aqueous suspension;
    b) adjusting a pH of the aqueous suspension to 5 to 10;
    c) adding a solution of one or more rubbers in an organic solvent to the aqueous suspension;
    d) removing the organic solvent, thereby obtaining rubber powder in water;
    e) removing most of the water from the rubber powder; and
    f) adjusting a residual moisture level of the rubber powder to $\leq 2\%$, thereby obtaining said fine particle rubber powder;
    wherein said rubbers are prepared by solution polymerization and/or from rubber present in the organic solvent.

2. The process as claimed in claim 1, wherein the process proceeds as follows
    a) suspending 1) the silicatic filler and the organosilicon compound or 2) the silicatic filler modified with the organosilicon compound in water in the presence of a surface-active substance and/or of one or more substances which activate the surface of silica, thereby obtaining an aqueous suspension;
    b) treating the aqueous suspension with a rubber solution at a pH of 5 to 10, and adjusting the pH of the aqueous suspension to a value of from 2 to 7 using a Brönsted acid or a Lewis acid;
    c) heating the aqueous suspension prepared in a) or in a) and b) for 5 to 120 min at a temperature of 30 to 90° C.;
    d) adding the solution of the rubber in the organic solvent to the suspension prepared in a), b) or c),
    e) removing the organic solvent;
    f) removing most of the water from the rubber powder then present in water by solid/liquid separation;
    g) granulating said rubber powder to obtain a particulate; and
    h) adjusting a residual moisture level of the rubber powder by drying to $\leq 2$ wt. %.

3. The process as claimed in claim 1, wherein said rubber is a styrene-butadiene rubber with a styrene content of from 10 to 30 wt. % and with a content of from 20 to 55 wt. % of a compound selected from the group consisting of 1,2-vinylbutadiene, isoprene rubber, butadiene rubber with 1,4-cis configuration 90%, polypentenamer rubber, polyoctenamer rubber, polynorbornene rubber, butyl rubber, halobutyl rubber having chlorine or bromine as halogen atom, ethylene-propylene and ethylene-propylene-diene rubber.

4. The process as claimed in claim 1, wherein said organosilicon compound is respresented by the following formulae $$[R_n\text{—}(RO)_{3-n}\text{Si-}(Alk)_m\text{-}(ar)_p]_q[B] \quad (I)$$
$$R^1{}_n\text{—}(RO)_{3-n}\text{Si-}(alkyl) \quad (II)$$
or
$$R^1{}_n\text{—}(RO)_{3-n}\text{Si-}(alkenyl) \quad (III)$$
wherein

| | |
|---|---|
| B | is —SCN, —SH, —Cl, —NH$_2$ (if q = 1) or -S$_x$- (if q = 2); |
| R and R$^1$ | are a branched or unbranched alkyl group having from 1 to 4 carbon atoms, or a phenyl radical, and the meaning of each R and R$^1$ may be the same or different; |
| n | is 0, 1 or 2; |
| alk | is a linear or branched bivalent hydrocarbon radical having from 1 to 6 carbon atoms; |
| m | is 0 or 1; |
| ar | is an arylene radical having from 6 to 12 carbon atoms; |
| p | is 0 or 1 with the proviso that p and n are not simultaneously 0; |
| x | is a number from 2 to 8; |
| alkyl | is a linear or branched saturated monovalent hydrocarbon radical having from 1 to 20 carbon atoms; and |
| alkenyl | is a linear or branched unsaturated monovalent hydrocarbon radical having from 2 to 20 carbon atoms. |

5. The process as claimed in claim 1, wherein, based on 100 parts of silicatic filler, from 0.5 to 15 parts of said organosilicon compound are suspended in water, in the form of free unbound silane together with the filler, or in the form of a presilanized modification of the filler.

6. The process as claimed in claim 1, wherein the suspension comprises from 0.1 to 2 wt. % of a non-ionic, cationic, or anionic surfactant, based on the filler content.

7. The process as claimed in claim 1, wherein the suspension comprises from 0.3 to 9 wt. % of a silica activator selected from the group consisting of a dialcohol, a polyalcohol, an amine or a mixture thereof, based on the filler.

8. The process as claimed in claim 1, further comprising adding one or more rubber emulsions to a filler/organosilicon suspension;

wherein a proportion of said rubber emulsion does not exceed 15 phr based on the entirety of the rubber within the rubber powder.

9. The process as claimed in claim 1, wherein a pH of the suspension prepared in water is adjusted to a value of from 2 to 7 using a Brönsted acid or a Lewis acid.

10. The process as claimed in claim 1, wherein the suspension in water is heated for 5 to 120 min at a temperature of 30 to 90° C.

11. The process as claimed in claim 1, wherein 5 to 300 phr of one or more silicatic fillers with a nitrogen surface area of from 1 to 1000 m$^2$/g and with a DBP value of from 150 to 400 ml/100 g are used.

12. The process as claimed in claim 1, wherein a rubber solution comprising one or more rubbers in an organic solvent is added to the suspension in water, and then the solvent is removed.

13. The process as claimed in claim 1, wherein said fine particle-rubber powder is formed in an aqueous phase.

14. The process as claimed in claim 1, further comprising adding an additive which is a filler other than the silicatic filler, a processing aid or a mixture thereof.

15. The process as claimed in claim 1, wherein most of the water in the rubber powder is removed by a mechanical removal step.

16. The process according to claim 1, further comprising: shaping said fine-particle rubber powder.

17. The process according to claim 1, wherein said silicatic filler is a precipitated silica.

* * * * *